(12) United States Patent
Sung et al.

(10) Patent No.: US 12,362,699 B2
(45) Date of Patent: Jul. 15, 2025

(54) ENERGY HARVESTING SYSTEM AND INDICATOR USING SAME

(71) Applicant: HUJECT, Seoul (KR)

(72) Inventors: Moses Sung, Seoul (KR); Won Keun Yoo, Suwon-si (KR)

(73) Assignee: HUJECT, Seoul (KR)

( * ) Notice: Subject to any disclaimer, the term of this patent is extended or adjusted under 35 U.S.C. 154(b) by 178 days.

(21) Appl. No.: 18/546,069

(22) PCT Filed: Jan. 26, 2022

(86) PCT No.: PCT/KR2022/001375
§ 371 (c)(1),
(2) Date: Aug. 10, 2023

(87) PCT Pub. No.: WO2022/177198
PCT Pub. Date: Aug. 25, 2022

(65) Prior Publication Data
US 2024/0136970 A1  Apr. 25, 2024
US 2024/0235459 A9  Jul. 11, 2024

(30) Foreign Application Priority Data
Feb. 18, 2021 (KR) .................. 10-2021-0021521

(51) Int. Cl.
*H02S 20/26* (2014.01)
*B64U 70/90* (2023.01)
(Continued)

(52) U.S. Cl.
CPC .............. *H02S 20/26* (2014.12); *B64U 70/90* (2023.01); *G09F 19/226* (2013.01); *H02S 20/30* (2014.12); *H02S 40/22* (2014.12)

(58) Field of Classification Search
CPC .......... H02S 20/20; H02S 20/26; H02S 20/30; H02S 40/22
See application file for complete search history.

(56) References Cited

U.S. PATENT DOCUMENTS

2006/0090789 A1*  5/2006  Thompson ............ F24S 30/425
136/246
2011/0233157 A1*  9/2011  Kmita ..................... H02S 20/24
211/41.1
(Continued)

FOREIGN PATENT DOCUMENTS

JP        07-039962 Y2    9/1995
JP        6621148 B2     12/2019
(Continued)

OTHER PUBLICATIONS

International Search Report issued from PCT International Application No. PCT/KR2022/001375 issued on May 11, 2022.
(Continued)

*Primary Examiner* — Golam Mowla

(57) ABSTRACT

An energy harvesting system and an indicator using same are disclosed. The disclosed indicator using an energy harvester comprises: an energy harvesting unit including at least one solar cell; a panel unit, which is arranged to face the energy harvesting unit, transmits sunlight and displays guide information; and a light-emitting unit for emitting light at the side surface of the panel unit.

5 Claims, 5 Drawing Sheets

(51) Int. Cl.
　　　*G09F 19/22*　　(2006.01)
　　　*H02S 20/30*　　(2014.01)
　　　*H02S 40/22*　　(2014.01)

(56)　　　　　　References Cited

U.S. PATENT DOCUMENTS

| | | | | |
|---|---|---|---|---|
| 2012/0273023 | A1* | 11/2012 | Ely | F24S 30/425 |
| | | | | 136/246 |
| 2014/0216522 | A1* | 8/2014 | Au | F24S 25/10 |
| | | | | 136/246 |
| 2016/0352284 | A1* | 12/2016 | Tung | H02S 20/30 |
| 2017/0370621 | A1* | 12/2017 | Port | F24S 20/70 |
| 2018/0278199 | A1* | 9/2018 | Chang | H02S 20/30 |
| 2019/0134822 | A1* | 5/2019 | Clemenzi | H02S 20/32 |

FOREIGN PATENT DOCUMENTS

| | | |
|---|---|---|
| KR | 10-1000293 B1 | 12/2010 |
| KR | 10-2012-0062429 A | 6/2012 |
| KR | 10-2012-0063182 A | 6/2012 |
| KR | 10-1150706 B1 | 6/2012 |
| KR | 10-1931646 B1 | 12/2018 |
| KR | 10-2020-0051908 A | 5/2020 |

OTHER PUBLICATIONS

Written Opinion of International Search Authority for PCT International Application No. PCT/KR2022/001375 issued on May 11, 2022.

* cited by examiner

ENERGY HARVESTING SYSTEM AND INDICATOR USING SAME

CROSS-REFERENCE TO RELATED APPLICATIONS

This application is a National Stage Entry of PCT International Application No. PCT/KR2022/001375, which was filed on Jan. 26, 2022, and which claims priority from and the benefit of Korean Patent Application KR 10-2021-0021521, filed with the Korean Intellectual Property Office on Feb. 18, 2021, the disclosure of which are hereby incorporated by reference in its entirety.

TECHNICAL FIELD

The present disclosure relates to an energy harvesting system and an indicator using the same.

BACKGROUND ART

Recently, as the efficiency of energy harvesters increases, various systems and applications using an energy harvester have been developed. In addition to solar cells, piezoelectric elements, thermoelectric elements, and the like are used in energy harvesters.

These energy harvesters are applied to indicators such as signboards, signs, automobiles, and blinds in various devices and places. The power generated by the energy harvester is used as a power source for the indicator. In particular, attempts are being made to supply power to the indicator using an energy harvester in an environment where external power supply is challenging.

DISCLOSURE

Technical Problem

The present disclosure is directed to providing an energy harvesting system exhibiting higher power generation efficiency. In addition, the present disclosure is directed to providing an energy harvesting system that can be used as a window of a building or a window of a vehicle.

In addition, the present disclosure is directed to providing an indicator that is thinner and has a reduced volume.

Technical Solution

One aspect of the present disclosure provides an indicator using an energy harvester including an energy harvesting unit including: at least one solar cell; a panel unit which is disposed to face the energy harvesting unit and transmits sunlight and on which guide information is displayed; and a light-emitting unit disposed at a side surface of the panel unit to emit light.

Another aspect of the present disclosure provides an indicator using an energy harvester including a frame that transmits sunlight and displays guide information; an energy harvesting unit including at least one solar cell and disposed inside the frame; and a light-emitting unit disposed inside the frame to emit light.

Still another aspect of the present disclosure provides an energy harvesting system including a first panel that transmits sunlight; a second panel that transmits sunlight; a fixing frame for fixing the first and second panels which are spaced a preset separation distance from each other; and blinds disposed between the first and second panels and including a solar cell.

Advantageous Effects

According to an embodiment of the present disclosure, since blinds in which solar cells are disposed in a boundary area between indoors and outdoors, the power generation efficiency of the energy harvesting system can be increased.

Also, according to an embodiment of the present disclosure, an indicator using an energy harvester that is capable of emitting light without an external power supply can be provided.

Furthermore, according to an embodiment of the present disclosure, since an indicator having a thinner and reduced volume is provided, advertising effects can be provided without compromising the appearance of the building, and damage to billboards or accidents caused by strong winds or the like can be reduced.

MODES OF THE INVENTION

Figure 1:
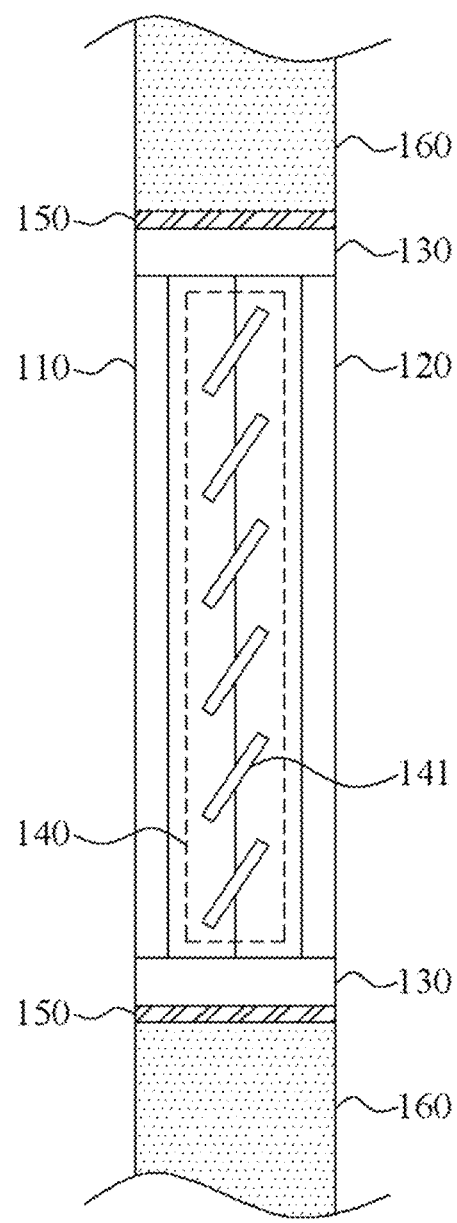
FIG. 1 is a diagram for describing an energy harvesting system according to an embodiment of the present disclosure.

Since the present disclosure can undergo various changes and have various embodiments, specific embodiments will be illustrated in the drawings and described in detail in the detailed description. However, this is not intended to limit the present disclosure to specific embodiments, and should be understood to include all modifications, equivalents, and substitutes included in the spirit and scope of the present disclosure. Like reference numbers have been used for like elements throughout the description of each figure.

Hereinafter, exemplary embodiments of the present disclosure will be described in details with reference to the accompanying drawings.

FIG. 1 is a diagram for describing an energy harvesting system according to an embodiment of the present disclosure.

Referring to FIG. 1, the energy harvesting system according to the embodiment of the present disclosure includes first and second panels, a fixing frame, and blinds. According to the present disclosure, a battery for storing the generated electric power, an actuator for adjusting a rotation angle and position of a blind slat, and the like may be further included.

A first panel 110 and a second panel 120 are panels that transmit sunlight, and may transmit sunlight through a material such as glass or acrylic. The first and second panels 110 and 120 have high transmittance, may have various colors, and may be made of various materials having high strength to protect blinds 140.

A fixing frame 130 fixes the first and second panels 110 and 120, which are spaced a preset separation distance apart from each other, and the blinds 140 are disposed between the first and second panels 110 and 120. The separation distance between the first and second panels may be determined according to the size of the blinds 140.

The blinds 140 are an energy harvester including solar cells, and as an example, solar cells may be disposed on each of the slats 141 of the blinds 140.

Since the energy harvesting system according to the embodiment of the present disclosure uses the blinds 140 as an energy harvester, the energy harvester can be used as a window of a building or a window of a vehicle that needs to adjust the inflow amount of sunlight. FIG. 1 illustrates an example in which the energy harvesting system according to the embodiment of the present disclosure is installed in a window installation space on an outer wall 160 of a building and is used as a window system.

When the energy harvesting system is used as a window of a building, a user can use electric power generated from the solar cells while controlling the inflow amount of sunlight by adjusting the rotation angle or position of the slats 141.

In particular, according to an embodiment of the present disclosure, not only can the blinds 140, which are an energy harvester, be protected by the first and second panels 110 and 120, but also the blinds 140 are disposed between the panels, thereby increasing the power generation efficiency of solar cell.

In the case of a solar cell, the highest power generation efficiency is shown at a temperature of 25° C., and the power generation efficiency is lowered at a temperature higher or lower than 25 degrees. Accordingly, in general, when blinds including solar cells installed indoors, as blinds are disposed indoors, the power generation efficiency of the solar cells may decrease due to an increase in room temperature. However, since the blinds 140 according to the embodiment of the present disclosure are disposed in the boundary region between the outside and inside of the building, they can provide high power generation efficiency at an intermediate temperature between the outside and inside of the building.

Meanwhile, in order to increase the amount of power harvested according to the embodiment, the energy harvesting system may further include a piezoelectric element 150. The piezoelectric element 150 is disposed on the fixing frame and converts the vibrations of the first or second panel 110 or 120 into electric power.

As described above, when the energy harvesting system of the present disclosure is used as a window system of a building, the first and second panels may be shaken by drafts of air, and the piezoelectric element may convert the vibrations of the first or second panels 110 and 120 into electric power. As an example, the fixing frame may be installed on the outer wall 160 of the building, and the piezoelectric element 150 may be disposed between the outer wall and the fixing frame.

Figure 2:
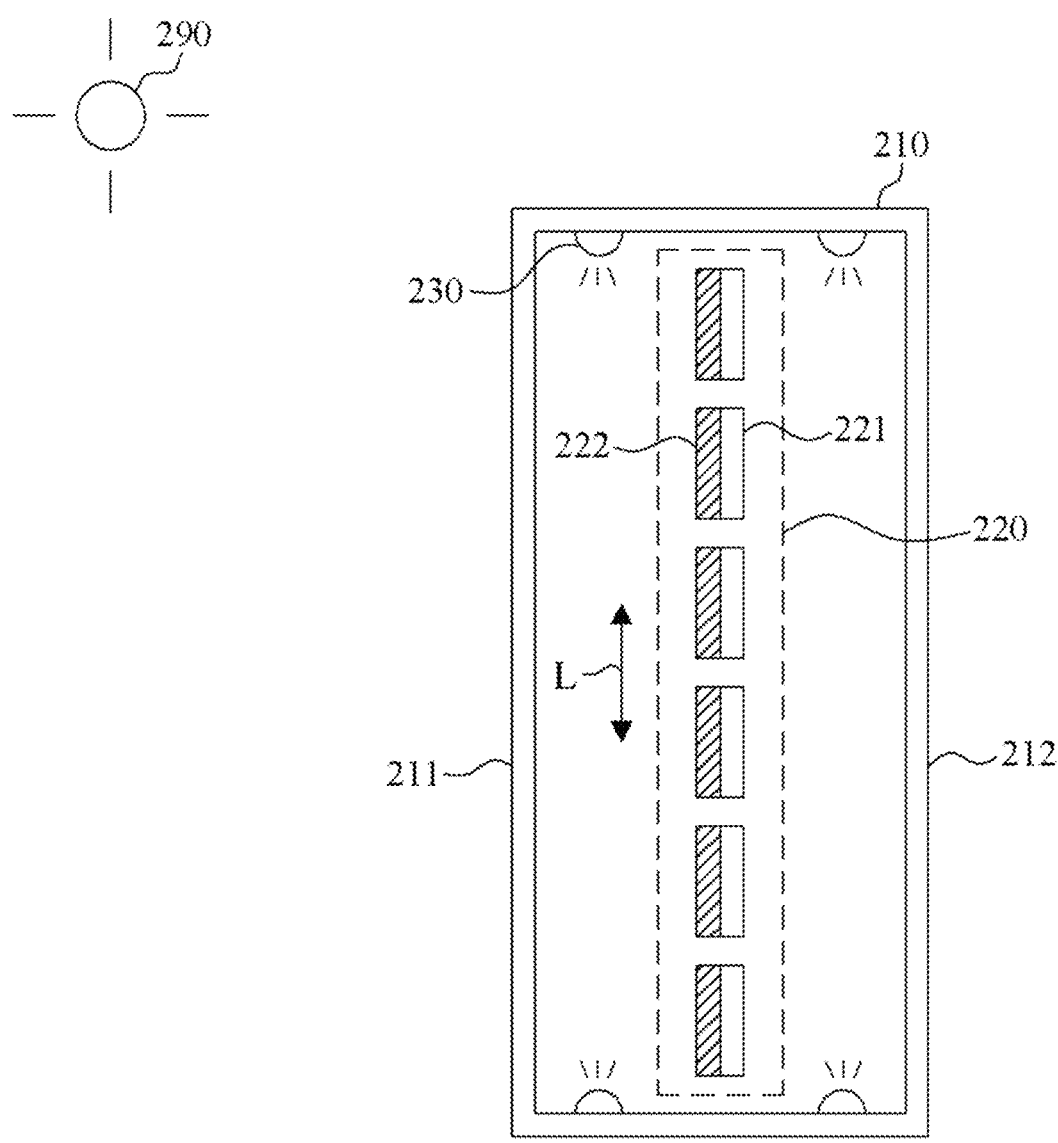
FIGS. 2 to 4 are diagrams for describing an indicator using an energy harvester according to an embodiment of the present disclosure.
Figure 3:
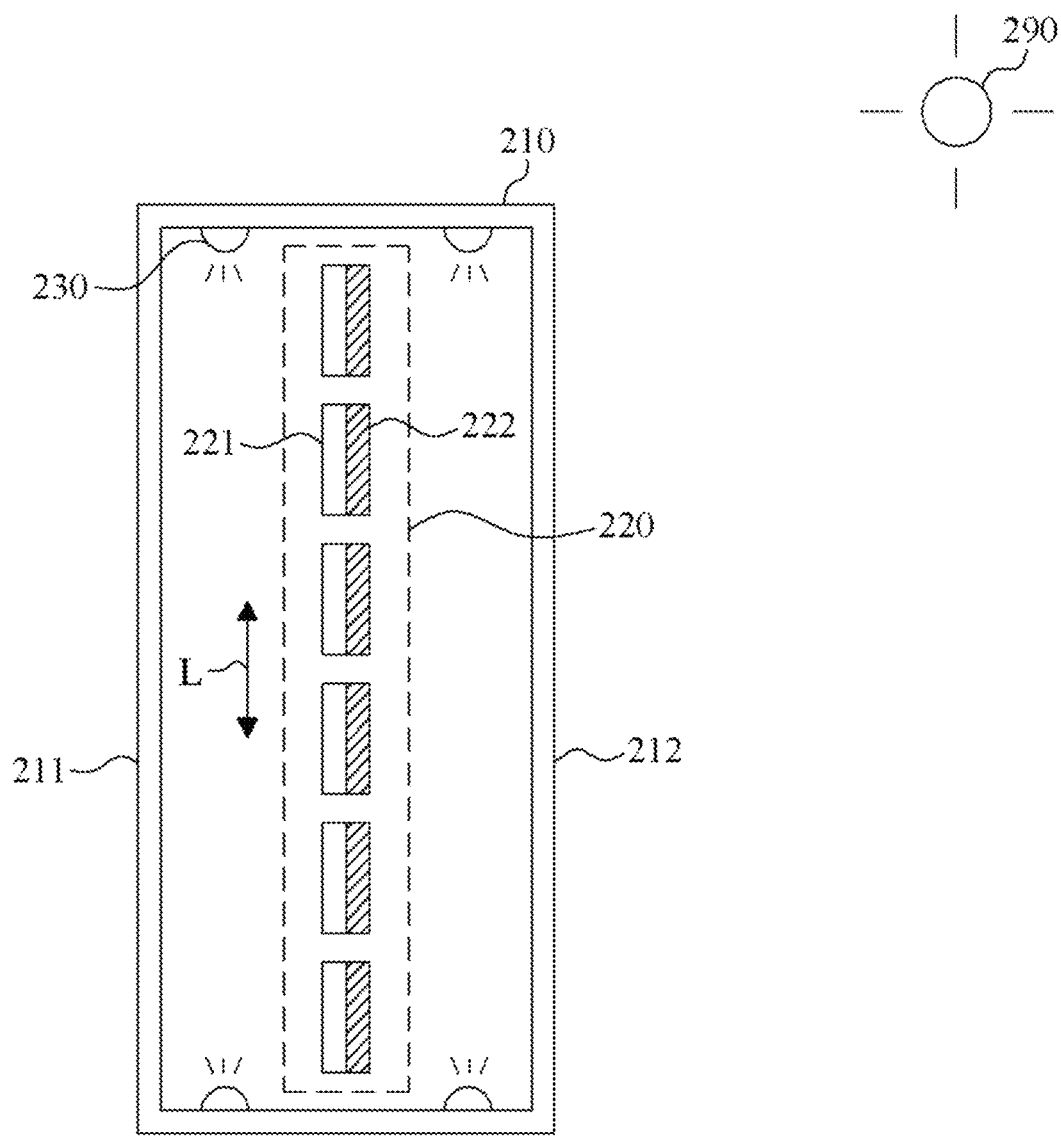
Figure 4:
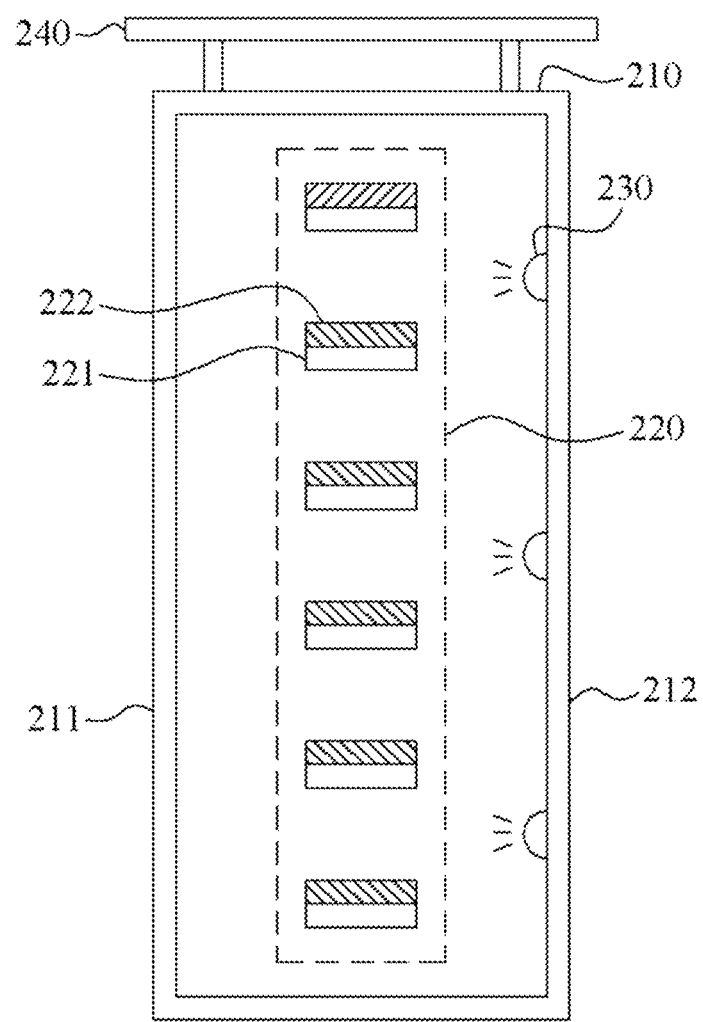

FIGS. 2 to 4 are diagrams for describing an indicator using an energy harvester according to an embodiment of the present disclosure.

Referring to FIG. 2, the indicator according to the embodiment of the present disclosure is a device that provides necessary information to the public, such as a signboard or sign, and includes a frame 210, an energy harvesting unit 220, and a light-emitting unit 230. In some embodiments, a battery system for storing power generated by an energy harvesting unit and measuring an amount of power, an actuator, and the like may be further included.

The frame 210 transmits sunlight and protects the energy harvesting unit 220 and the light-emitting unit 230 disposed inside the frame. Guide information is displayed on the frame 210, and the guide information may be printed on or attached to the outer surface of the frame 210 in the form of a sticker. The guide information may be advertisement information or driving information and the guide information may be displayed on one surface 211 and the other surface 212 of the frame.

The energy harvesting unit 220 is disposed inside the frame, and at least one solar cell is included in the energy harvesting unit 220. In an embodiment, the energy harvesting unit 220 may include a plurality of slats 221 on which the solar cells 222 are disposed, and the rotation angle or position of these slats 221 may be adjusted like the slats of the blinds described in FIG. 1. Each of the slats 221 may be rotated by an actuator or based on a blind structure.

The light-emitting unit 230 emits light inside the frame and may emit light using the power generated by the energy harvesting unit 220. According to an embodiment of the present disclosure, an indicator capable of emitting light without an external power supply may be provided.

In an embodiment, the light-emitting unit 230 may be disposed on the top or bottom of the frame 210 (or disposed on the side of the frame 210) so as to emit light in a longitudinal direction L of the energy harvesting unit 220. Since the light-emitting unit 230 is disposed on the top or bottom of the frame 210, sunlight passing through the one surface 211 and the other surface 212 of the frame may not be blocked by the light-emitting unit 230. In addition, the amount of power generated by the energy harvesting unit 220 may increase as long as sunlight is not blocked by the light-emitting unit 230.

As described above, the slats may rotate, and as an example, may rotate according to the amount of power generated by the solar cell. In FIG. 2, the sun 290 is positioned to shine sunlight toward the one surface 211 of the frame, and the solar cell 222 disposed on one surface of the slat 221 also faces the one surface 211 of the frame. When the position of the sun 290 is changed as shown in FIG. 3 and the amount of power generated by the solar cell 222 decreases, the slats 221 rotate 180 degrees to face the other surface 212 of the frame opposite to the one surface 211, as shown in FIG. 3.

Meanwhile, depending on the embodiment, the guide information may be displayed on the one surface 211 or the other surface 212 of the frame, and as shown in FIG. 4, the energy harvesting unit 220 may be disposed between the guide information and light-emitting unit 230. When the guide information is displayed on the one surface 211 of the frame, the light-emitting unit 230 may be disposed on the other surface of the frame 210.

When the amount of power generated by the solar cell is high, the amount of insolation from the sun is high, so even if the light-emitting unit 230 is not turned on, the guide information can be easily checked. Therefore, when the amount of solar radiation is small and the amount of power generated by the solar cell 222 is less than a first threshold value, the light-emitting unit 230 is turned on, and at this time, the slats 221 may be rotated and positioned horizontally so that the light of the light-emitting unit 230 can travel in the direction in which the guide information is displayed, as shown in FIG. 4.

In addition, as shown in FIG. 4, the indicator according to one embodiment of the present disclosure may further include a plate 240 coupled to an upper portion of the frame and a wireless power transmission device disposed inside the plate 240. The plate 240 provides a landing site for drones, and the wireless power transmission device may transmit power to the drone that has landed on the plate 240.

The wireless power transmission device may check the charge amount of the battery and provide power to the drone when a preset power transmission condition is satisfied. The power transmission condition includes a first condition in which the charge amount of the battery is greater than or equal to a second threshold value set in advance, and a second condition in which battery power is not currently supplied to the light-emitting unit 230, that is, the light-emitting unit 230 is turned off. In addition, the wireless power transmission device may transmit power to the drone when at least one of the first and second conditions is satisfied.

Figure 5:
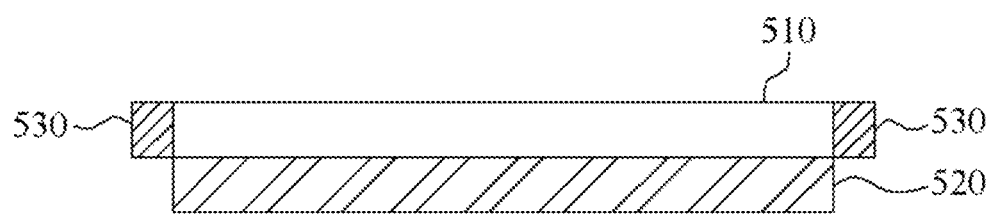
FIGS. 5 to 6 are diagrams for describing an indicator using an energy harvester according to another embodiment of the present disclosure.
Figure 6:
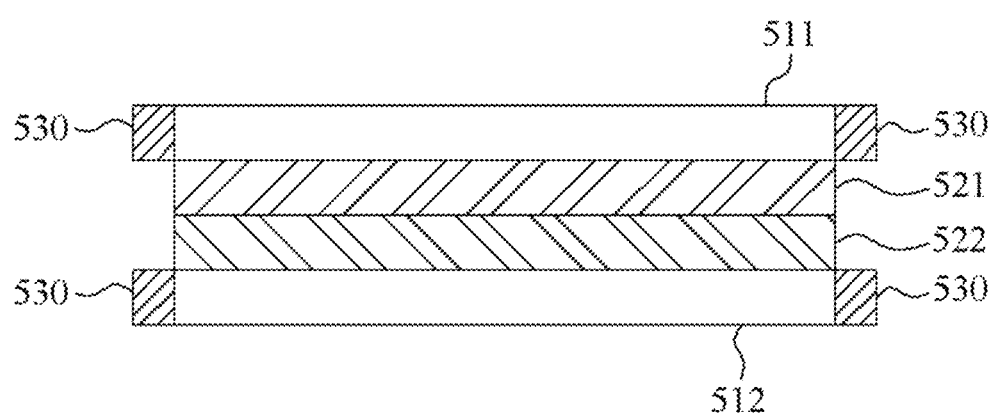

FIGS. 5 to 6 are diagrams for describing an indicator using an energy harvester according to another embodiment of the present disclosure.

Referring to FIG. 5, the indicator according to the embodiment of the present disclosure includes a panel unit 510, an energy harvesting unit 520, and a light-emitting unit 530.

The energy harvesting unit 520 includes at least one solar cell, and may be a solar panel as an example.

The panel unit 510 on which the guide information is displayed transmits sunlight and may be disposed to face the energy harvesting unit 520. As an example, the panel unit 510 may be stacked on a solar panel and may include one surface or the other surface treated to be opaque.

Transmittance of sunlight may be increased by the opaque treatment, and the amount of power generated by a solar cell may be increased. The opaque treatment may be performed by forming an irregular pattern on one surface or the other surface of the panel unit 510 or coating with nanoparticles.

In addition, transmission of guide information can be enhanced by opaque treatment. In general, since a solar panel is dark, it is difficult to easily transmit advertising text. However, when one side or the other side of the panel unit is changed to white by opaque treatment, the advertising text or the like can be easily transmitted.

The light-emitting unit 530 emits light from the side of the panel unit 510. Light from the light-emitting unit 530 increases the transmission power of guide information and increases the amount of power generated by the energy harvesting unit 520. In addition, since the light-emitting unit 530 is disposed on the side of the panel unit 510, as long as sunlight passing through the panel unit 510 and reaching the energy harvesting unit 520 is not blocked by the light-emitting unit 530, the amount of power generated by the energy harvesting unit 520 may be further increased.

When the indicator according to one embodiment of the present disclosure is used as a billboard, a thinner and less bulky billboard can be provided due to a structure in which a panel unit and a solar panel are stacked. Accordingly, in this case, not only can an advertising effect be provided without degrading the appearance of the building, but also damage to the billboard due to a strong wind or falling accidents can be reduced.

Meanwhile, according to another embodiment of the present disclosure, as shown in FIG. 6, the energy harvesting unit 520 includes first and second energy harvesters 521 and 522, and the panel unit 510 has first and second panels 511 and 512. In this case, guide information may be provided through both sides of the indicator as well as one side.

The first and second energy harvesters 521 and 522 include solar cells and are disposed to face each other. Also, the first and second panels 511 and 512 may be disposed to face the first and second energy harvesters 521 and 522, respectively. That is, the second energy harvester 522 is stacked on the second panel 512, and the first panel 511 is stacked on the first energy harvester 521 stacked on the second energy harvester 522.

At this time, the light-emitting unit 530 may emit light of the same or different intensities to the first and second panels 511 and 512 according to the amount of power generated by the first and second energy harvesters 521 and 522. As an example, light with a higher intensity may be emitted to a panel facing an energy harvester having a relatively small amount of power generation. For example, according to the moving direction of the sun, when the amount of power generated by the first energy harvester 521 is greater than the amount of power generated by the second energy harvester 522, and then the amount of power generated by the second energy harvester 522 is greater than the amount of power generated by the first energy harvester 521, the intensity of light emitted to the first panel 511 may increase, and the intensity of light emitted to the second panel 512 may decrease.

As described above, the present disclosure has been described by specific details such as specific components and limited embodiments and drawings, but these are provided to help a more general understanding of the present disclosure, and the present disclosure is not limited to the above embodiments. Those skilled in the art to which the present disclosure pertains can make various modifications and variations from these descriptions. Therefore, the spirit of the present disclosure should not be limited to the described embodiments, and it will be said that not only the claims to be described below, but also all modifications equivalent to these claims belong to the scope of the present disclosure.

What is claimed is:

1. An indicator using an energy harvester, comprising: a frame which transmits sunlight and on which guide information is displayed; an energy harvesting unit including at least one solar cell and disposed inside the frame; and a light-emitting unit inside the frame to emit light,
   wherein the energy harvesting unit includes a plurality of slats on which the solar cell is disposed and whose rotation angle is adjusted, and
   wherein the energy harvesting unit is disposed between the guide information and the light-emitting unit and rotates so that the light of the light-emitting unit, which is turned on when the amount of power generated by the solar cell is less than or equal to a first threshold value, travels in a direction in which the guide information is displayed.

2. The indicator of claim 1, wherein the light-emitting unit emits the light in a longitudinal direction of the energy harvesting unit.

3. The indicator of claim 1, wherein:
   the solar cell is disposed on one surface of the slats; and
   the slats are directed toward one surface of the frame or toward the other surface of the frame, which is opposite to the one surface, according to an amount of power generated by the solar cell.

4. The indicator of claim 1, further comprising:
   a plate coupled to the frame and providing a drone landing site; and
   a wireless power transmission device that transmits power to a drone that has landed on the plate.

5. The indicator of claim 4, wherein the wireless power transmission device transmits power to the drone when at least one of a first condition in which a charge amount of a battery is greater than or equal to a second threshold value and a second condition in which the light-emitting unit is turned off is satisfied.

\* \* \* \* \*